US012618393B2

(12) United States Patent
Pineda Amo

(10) Patent No.: US 12,618,393 B2
(45) Date of Patent: May 5, 2026

(54) DETERMINATION OF OSCILLATION FREQUENCIES OF WIND TURBINES AND RELATED METHODS

(71) Applicant: General Electric Renovables Espana, S.L., Barcelona (ES)

(72) Inventor: Isaac Pineda Amo, Barcelona (ES)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/595,887

(22) Filed: Mar. 5, 2024

(65) Prior Publication Data

US 2024/0301871 A1     Sep. 12, 2024

(30) Foreign Application Priority Data

Mar. 6, 2023     (EP) .................................... 23382207

(51) Int. Cl.
*F03D 17/00*          (2016.01)
*F03D 7/02*           (2006.01)

(52) U.S. Cl.
CPC ......... *F03D 17/006* (2023.08); *F03D 7/0224* (2013.01); *F05B 2270/32* (2013.01)

(58) Field of Classification Search
CPC ... F03D 7/0224; F03D 17/006; F05B 2270/32
See application file for complete search history.

(56) References Cited

U.S. PATENT DOCUMENTS

| | | | | |
|---|---|---|---|---|
| 6,626,642 | B1 * | 9/2003 | Veldkamp ............... | F03D 80/00 |
| | | | | 416/79 |
| 6,695,588 | B1 * | 2/2004 | Nielsen ................... | F03D 80/00 |
| | | | | 416/500 |
| 7,837,439 | B2 * | 11/2010 | Bech ..................... | F03D 1/0675 |
| | | | | 416/62 |
| 10,018,186 | B2 * | 7/2018 | Bergua ..................... | F03D 1/00 |
| 11,118,646 | B2 * | 9/2021 | Jiang ........................ | F16F 7/108 |
| 11,255,744 | B2 * | 2/2022 | Christiansen ......... | G01M 5/005 |
| 11,279,452 | B2 * | 3/2022 | Allen ...................... | B63B 39/03 |
| 11,293,411 | B2 * | 4/2022 | Mortensen ............. | F03D 13/20 |
| 11,346,324 | B2 * | 5/2022 | Johansen .............. | F03D 7/0296 |
| 11,560,878 | B2 * | 1/2023 | Madsen ............... | F03D 7/0296 |

(Continued)

FOREIGN PATENT DOCUMENTS

| | | |
|---|---|---|
| CN | 112985578 A | 6/2021 |
| DE | 202007019622 U1 | 6/2014 |
| EP | 3705719 A1 | 9/2020 |

OTHER PUBLICATIONS

European Search Report Corresponding to EP23382207 on Aug. 30, 2023.

*Primary Examiner* — Tulsidas C Patel
*Assistant Examiner* — Thomas K Quigley
(74) *Attorney, Agent, or Firm* — Dority & Manning, P.A.

(57)          ABSTRACT

The present disclosure is related to methods for determining a frequency of an oscillation mode of a wind turbine, comprising: determining a motion of a first mass of a first tuned mass damper in the wind turbine and deriving the frequency of the oscillation mode of the wind turbine at least partially based on the determined motion of the first mass. The present disclosure further relates to methods for operating a wind turbine, and to wind turbines, particularly offshore wind turbines, comprising tuned mass dampers.

12 Claims, 5 Drawing Sheets

(56) References Cited

U.S. PATENT DOCUMENTS

| | | | | |
|---|---|---|---|---|
| 11,603,822 B2 * | 3/2023 | Johansen | ................ | F03D 13/10 |
| 11,732,495 B2 * | 8/2023 | Schneider | ............ | E04H 9/0215 |
| | | | | 52/167.2 |
| 11,732,690 B2 * | 8/2023 | Mitsch | .................. | F16F 7/1011 |
| | | | | 416/144 |
| 11,746,749 B2 * | 9/2023 | Li | ........................... | F03D 13/20 |
| | | | | 188/379 |
| 11,932,360 B2 * | 3/2024 | Allen | ..................... | B63B 1/107 |
| 11,946,444 B2 * | 4/2024 | Scholte-Wassink | ......................... | |
| | | | | F03D 1/0675 |
| 11,946,453 B2 * | 4/2024 | Liu | ......................... | F03D 80/80 |
| 12,006,998 B2 * | 6/2024 | Mitsch | ................. | F16F 9/0454 |
| 12,031,352 B2 * | 7/2024 | Hansen | ................ | E04H 9/0215 |
| 12,092,082 B1 * | 9/2024 | Snow | ..................... | F03D 17/015 |
| 12,128,995 B2 * | 10/2024 | Johnsen | ................. | B63B 35/44 |
| 12,129,905 B2 * | 10/2024 | Gao | ........................ | F16F 15/03 |
| 2009/0142193 A1 * | 6/2009 | Bech | .................... | F03D 1/0675 |
| | | | | 416/241 A |
| 2010/0021303 A1 * | 1/2010 | Nielsen | ................. | F16F 7/015 |
| | | | | 416/145 |
| 2013/0195653 A1 * | 8/2013 | Hayashi | ............... | F03D 7/0296 |
| | | | | 416/1 |
| 2013/0280064 A1 * | 10/2013 | van Steinvoren | ....... | F03D 13/35 |
| | | | | 416/1 |
| 2016/0215754 A1 * | 7/2016 | Seidel | ................... | E04H 9/0215 |
| 2017/0184077 A1 | 6/2017 | Caponetti et al. | | |

| | | | | |
|---|---|---|---|---|
| 2020/0209100 A1 * | 7/2020 | Christiansen | ....... | G01M 5/0016 |
| 2020/0271183 A1 * | 8/2020 | Jiang | ....................... | F16F 15/08 |
| 2020/0355166 A1 * | 11/2020 | Mortensen | ............. | F03D 80/00 |
| 2021/0047998 A1 * | 2/2021 | Mitsch | .................. | F03D 7/0296 |
| 2021/0246880 A1 * | 8/2021 | Johansen | ............... | F03D 13/35 |
| 2021/0254605 A1 * | 8/2021 | Madsen | ................. | F03D 17/00 |
| 2021/0269126 A1 * | 9/2021 | Allen | ..................... | B63B 39/03 |
| 2021/0317676 A1 * | 10/2021 | Schneider | ............ | E04H 9/0215 |
| 2021/0387702 A1 * | 12/2021 | Allen | ..................... | B63B 39/02 |
| 2022/0126957 A1 * | 4/2022 | Johnsen | ............... | B63B 39/005 |
| 2022/0228393 A1 * | 7/2022 | Hansen | ................ | E04H 9/0215 |
| 2022/0252047 A1 * | 8/2022 | Johansen | ............... | F03D 13/20 |
| 2023/0062968 A1 * | 3/2023 | Mitsch | .................. | F16F 7/1017 |
| 2023/0125305 A1 * | 4/2023 | Liu | ....................... | F16F 15/035 |
| | | | | 290/55 |
| 2023/0160455 A1 * | 5/2023 | Gao | ...................... | F16F 15/027 |
| | | | | 188/378 |
| 2023/0184210 A1 * | 6/2023 | Scholte-Wassink | ......................... | |
| | | | | F03D 1/0675 |
| 2023/0193875 A1 * | 6/2023 | Li | ........................... | F16F 15/035 |
| 2023/0279838 A1 * | 9/2023 | Danielsen | ................ | H02K 7/02 |
| | | | | 310/74 |
| 2023/0296155 A1 * | 9/2023 | Mitsch | ..................... | F16F 7/116 |
| | | | | 188/380 |
| 2023/0358214 A1 * | 11/2023 | Couturier | ............. | F03D 80/881 |
| 2024/0084778 A1 * | 3/2024 | Herrig | ................. | F03D 7/0298 |
| 2024/0101232 A1 * | 3/2024 | Allen | ..................... | B63B 39/03 |
| 2024/0301871 A1 * | 9/2024 | Pineda Amo | ......... | G01H 1/003 |

* cited by examiner

600

610

Determining motion of mass of TMD

620

Determining frequency of natural mode of wind turbine

630

Adjusting control strategy of wind turbine

700

Determining motion of mass of
TMD — 710

Determining frequency of natural
mode of wind turbine — 720

Determining rotational speed
exclusion range(s) — 730

Operating wind turbine to reduce
operational time in exclusion
range(s) — 740

DETERMINATION OF OSCILLATION FREQUENCIES OF WIND TURBINES AND RELATED METHODS

FIELD

The present disclosure relates to methods and systems for estimating a frequency of an oscillation mode of a wind turbine. Further, the present disclosure relates to methods for operating a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. This rotation generates a torque that is normally transmitted through a rotor shaft to a generator, either directly ("directly driven" or "gearless") or through the use of a gearbox. This way, the generator produces electricity which can be supplied to the electrical grid.

Wind turbines have evolved rapidly over the last decades with a clear trend of increasing size. The power generated by a wind turbine is proportional to the rotor swept area and, therefore to the square of the blade length. Thus, higher towers and longer blades have been used with the goal of extracting more energy from the wind, leading to a higher electricity production. The increase in size over the years has led to a substantial increase in the loads acting on wind turbine components, and has posed new challenges for a wide range of disciplines including mechanical, electrical, materials and civil engineering among others.

With the increase in size of wind turbines, wind turbines have also become more slender. Although load control in wind turbines has always been important to avoid structural failure and/or early retirement of components due to fatigue, this is even more important in the more recent, very tall wind turbines, e.g. with a power rating of 8 MW or more, specifically 10 MW or more, or 14 MW or more.

The likelihood of structural failure, e.g. due to fatigue, in wind turbine components, such as a tower structure of the wind turbine or a foundation of the wind turbine, is inter alia related to the magnitude and frequency of loads acting on the wind turbine and how these are transferred to the ground, either on land or on the seabed.

To mitigate premature structural failure of wind turbine components, it is known to take into account certain eigenfrequencies of the wind turbine. If the wind turbine is subjected to loads at or close to the eigenfrequency, resonance may occur, leading to rapidly increasing and dangerous loads. It is therefore known to define operational exclusions zones e.g. ranges of rotational speed where vibration resonances could cause severe structural damage and which are therefore to be avoided or reduced to a minimum.

The eigenfrequencies (and the corresponding exclusion zones) are generally calculated in the design phase of the wind turbine. But measuring oscillations using e.g. accelerometers and deriving eigenfrequencies therefore may also be carried out for example during a commissioning phase. The determination of eigenfrequencies in installed wind turbines is a complicated exercise, generally relying on significant computational resources and which is generally not performed during operation.

Wind turbine sites may be located on land ("onshore") but they may also be placed off the coast in the sea ("offshore")

to increase the energy production of the site and reduce environmental impact among others. Wind speeds at offshore locations are typically higher than on land. Further, wind speeds and wind direction offshore tend to be more stable, and therefore offshore sites may have higher and more consistent energy production than land sites.

In relation with load control and the aforementioned eigenfrequencies, offshore wind turbines represent an additional challenge. For example, wind turbines with the same monopile or jacket and wind turbine structure may have different eigenfrequencies in an offshore wind farm, because the soil is generally softer than on land, and soil conditions are more variable throughout a wind farm. The depth of the seabed is not necessarily constant resulting in different monopile lengths.

Moreover, it has been found that the eigenfrequencies of particularly offshore wind turbines, both floating wind turbines and wind turbines fixed at the seabed, may vary over their lifetime. Growth of algae, crustacea, barnacles, and other along the tower or pile structure, or floating structure has an effect on the eigenfrequencies as well. If the eigenfrequencies change, the predetermined methods of operation may lead to higher loads than expected. In order to avoid higher loads, increased operational exclusion zones may be defined, but this might lead to suboptimum operation and a corresponding reduction in Annual Energy Production (AEP).

The present disclosure provides methods and systems to at least partially overcome some of the aforementioned drawbacks.

SUMMARY

In an aspect of the present disclosure, a method for determining a frequency of an oscillation mode of a wind turbine is provided. The method comprises determining a motion of a first mass of a first tuned mass damper in the wind turbine and deriving the frequency of the oscillation mode of the wind turbine at least partially based on the determined motion of the first mass.

According to this aspect, the method allows obtaining an accurate estimation of the frequency of the oscillation mode of a wind turbine in a simple and reliable manner. The method is suitable to be carried out in wind turbines installed either on land or offshore, and may include the contribution of structure supporting the wind turbine (e.g. floating platform or foundations) on the dynamic response of the wind turbine. The methods according to this aspect may be performed autonomously, and even during operation and may provide indications for individual wind turbines rather than for a wind turbine type, a fleet or a wind farm. Variation of the eigenfrequencies over the life time of a wind turbine may also be detected.

In an additional aspect, a method for operating a wind turbine is disclosed. The method comprises determining a motion of a first mass of a first tuned mass damper in the wind turbine and deriving a frequency of an oscillation mode of the wind turbine at least partially based on the determined motion of the first mass. The method further comprises determining an exclusion range of rotational speeds of a rotor of the wind turbine to be avoided based on the derived frequency of the oscillation mode and operating the wind turbine so that an operational time of the wind turbine in the exclusion range is reduced or avoided.

According to this additional aspect, the operation of a wind turbine may be controlled and optimized compared with other approaches known in the art. The method provided allows inferring wind turbine rotational speed exclusion zones at least partially based on a motion of a mass of a tuned mass damper in the wind turbine. The method allows operating the wind turbine based in a safe and efficient manner, wherein the rotational speed exclusion zones are precisely determined even if they change over time.

In yet an additional aspect, a wind turbine comprising a tuned mass damper is provided. The tuned mass damper has a first mass, and the wind turbine further comprises a control system configured to determine a motion of the first mass of the tuned mass damper in the wind turbine and to determine a frequency of an oscillation mode of the wind turbine at least partially based on the determined motion of the first mass.

Thereby, the tuned mass damper in the wind turbine may be used to estimate a frequency of an oscillation mode of a wind turbine, while at the same time it provides damping to the wind turbine structure. When a tuned mass damper and these methods are used for the operation of a wind turbine, the overall cost and complexity of estimating a frequency of an oscillation mode of the wind turbine is reduced.

Throughout the present disclosure, an "oscillation mode" may be regarded as a general characterization of a specific state of oscillation. Most dynamical systems such as wind turbines can be excited, e.g. due to wind influence, in several modes; and these modes may co-exist simultaneously. Each mode is generally characterized by one or several frequencies associated with the modal field. For example, a system vibrating in a two-dimension space is defined by a single frequency, i.e. one-dimension displacement, whereas a system vibrating in a three-dimension space is defined by two frequencies, i.e. two-dimension displacement. Complex three-dimensional systems may be simplified so that a single oscillation displacement captures the dominant oscillation behavior.

Throughout the present disclosure, an eigenfrequency may be regarded as the frequency at which a system tends to oscillate in the absence of any driving force. The eigenfrequency may also be called "natural frequency". The motion pattern of a system oscillating at its eigenfrequency may be called the normal mode.

Throughout the present disclosure, a tuned mass damper (TMD) may be regarded as a device mounted in a structure (in this case a wind turbine) to reduce mechanical vibrations, consisting of a mass which is allowed to move with respect to the structure. Typically the mass may be connected to the structure through on one or more damped springs. Its oscillation frequency may be tuned to be similar to the resonant frequency of the structure it is mounted to (in this case a wind turbine), and reduces the object's maximum amplitude while weighing much less than it.

The term Tuned Mass Damper (TMD) is herein used to cover different kinds of TMD, including pendulum dampers, and rolling mass dampers. The TMD may be passive, semi-active or active dampers. Passive systems cannot change their damping characteristics. Semi-active dampers may be intermittently controlled to vary one or more damping characteristics, e.g. stiffness, spring constant, or weight. Active dampers may herein be regarded as systems which are continuously controlled to adapt its damping characteristics.

Additional objects, advantages and features of embodiments of the present disclosure will become apparent to those skilled in the art upon examination of the description, or may be learned by practice.

DETAILED DESCRIPTION OF EXAMPLES

Figure 1:
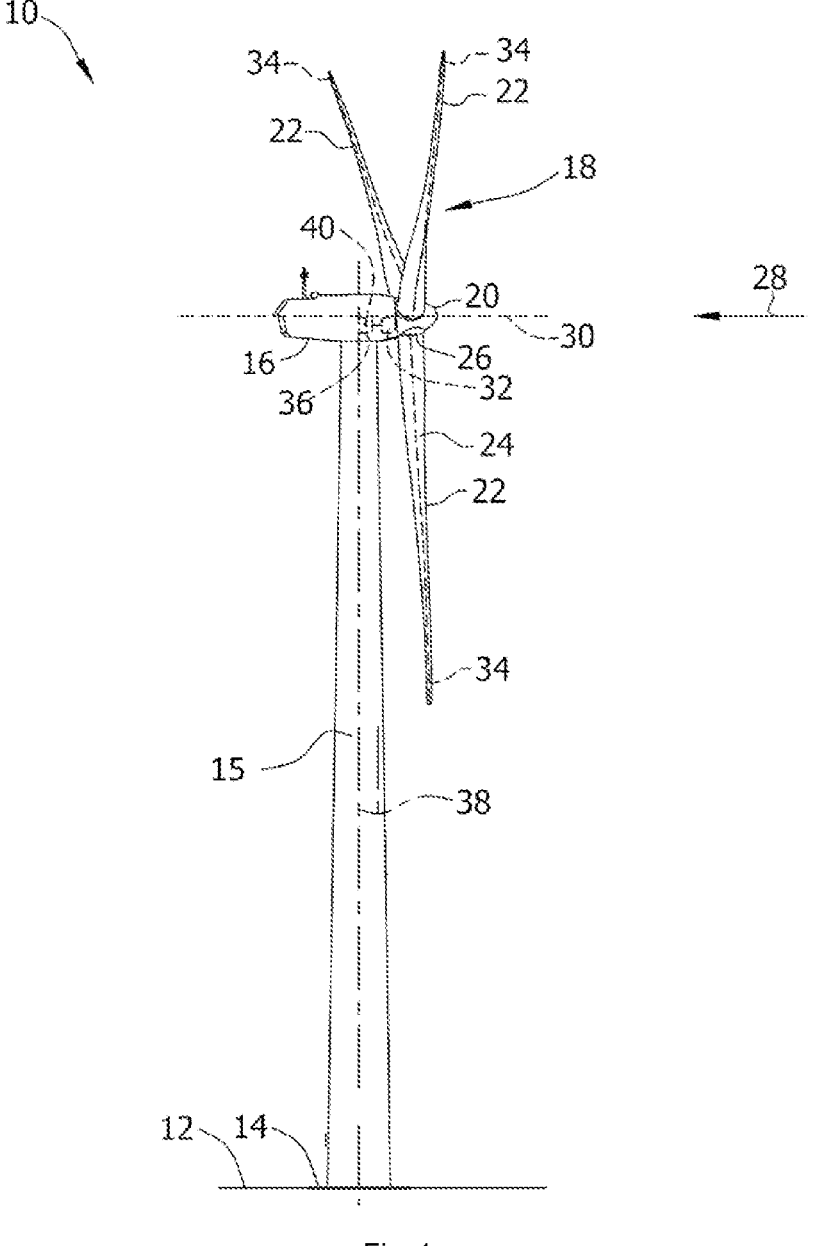
FIG. 1 schematically illustrates a perspective view of one example of a wind turbine.

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
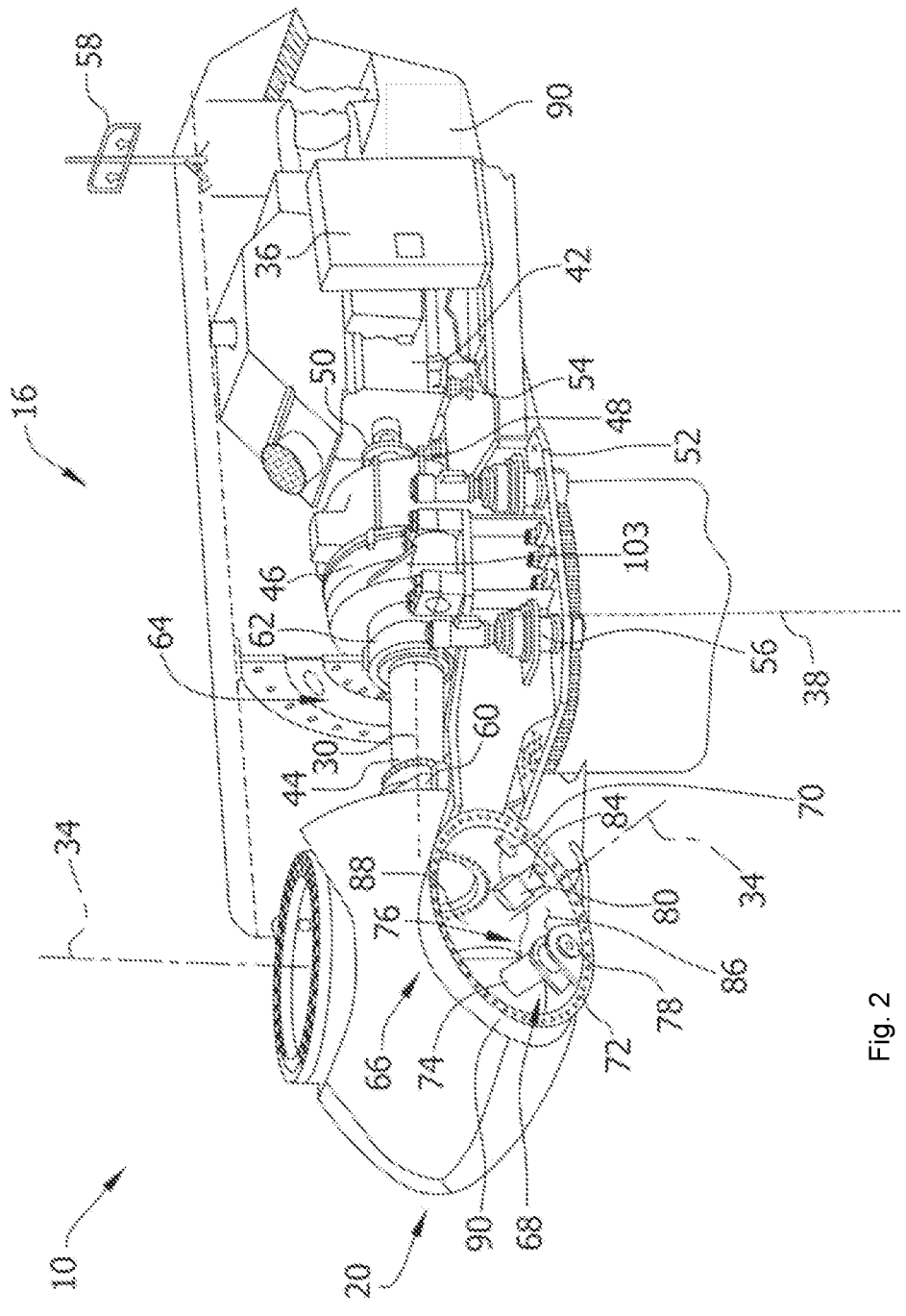
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (e.g. 10-35 KV). Said electrical energy is conducted via power cables from the nacelle 16 into the tower 15.

The gearbox 46, generator 42 and transformer 90 may be supported by a main support structure frame of the nacelle

16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
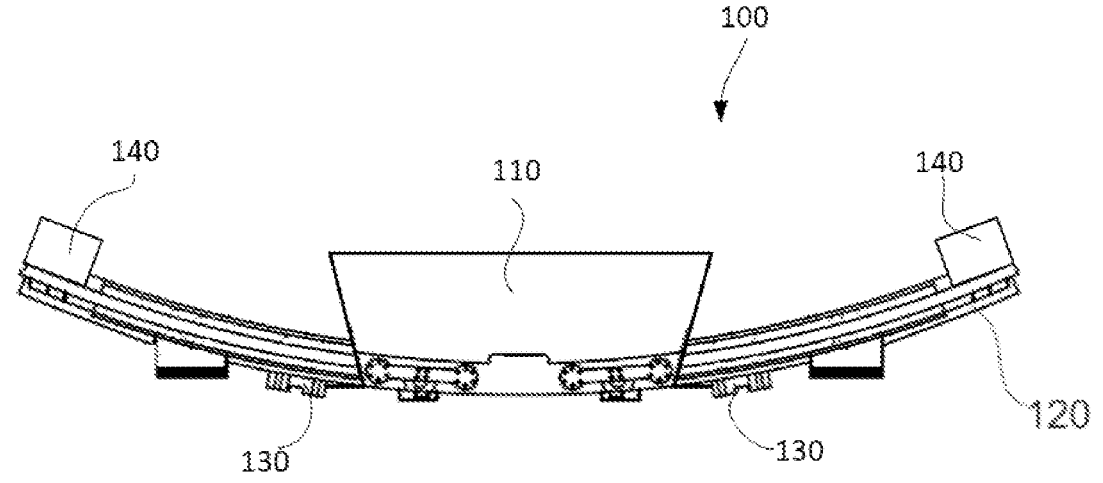
FIG. 3 schematically illustrates a side view of a tuned mass damper according to an example of the present disclosure.

FIG. 3 illustrates a side view of an example of a tuned mass damper 100, in this case a rolling mass damper. In particular, FIG. 3 shows a tuned mass damper 100 which may be used to estimate a frequency of an oscillation mode of a wind turbine 10. The tuned mass damper 100 comprises a first mass 100 movably connected to a stationary structure or guide 120. The first mass 110 is configured to move relative to the stationary structure 120 in at least one direction. The stationary structure or guide 120 may be arranged to be aligned e.g. with a fore-aft direction or a transverse direction of a nacelle.

Further, the tuned mass damper 100 of this example may comprise one or more sensors 130 configured to monitor a relative position between the first mass 110 and the stationary structure 120. Additionally, the sensors 130 may be configured to communicate with a processing unit configured to estimate the frequency of the oscillation mode of the wind turbine 10 at least partially based on the relative position between the first mass 110 and the stationary structure 120 as of function of time.

In the illustrated example in FIG. 3, the stationary structure 120 comprises a curved guiding element, but in other examples, the stationary structure 120 may comprise a substantially straight guiding element. Further, in examples, the stationary structure 120 may be a support configured to be connected to the wind turbine 10 from which the mass 110 may be suspended.

Also shown in FIG. 3, the sensors 130 may be proximity sensors such as inductive sensors, capacitive sensors, optical sensors, magnetic sensors, or ultrasonic sensors among others. Sensors 130 may also be contact sensors, pressure sensors or others. Note that although the sensors 130 have been illustrated coupled to the stationary structure, it is also possible to install the sensors in the mass and identify the relative motion of the mass with respect to at least a target location in the stationary structure.

FIG. 3 also shows that the tuned mass damper 100 may comprise security features such as stoppers 140. These components may act as a buffer, damping the oscillation of the mass in case this exceed a maximum amplitude. In addition, in other devices, the security features may comprise brakes to limit the velocity of the mass. The brakes may be hydraulic, pneumatic, or magnetic among others.

A method for determining a frequency of an oscillation mode of a wind turbine may comprise determining a motion of the first mass 110 of a first tuned mass damper 100 in the wind turbine. The method further comprises deriving the frequency of the oscillation mode of the wind turbine at least partially based on the determined motion of the first mass.

The mass of the tuned mass damper will tend to oscillate at a natural frequency of the wind turbine. The frequency of oscillation of the mass may be derived from the speed of the mass in oscillation. Thereby the frequency of the first normal mode of the wind turbine may be derived.

In examples, the speed of the mass may be determined by monitoring a position of at least the first mass with respect to the wind turbine as a function of time. Optionally, the position of at least the first mass comprises detecting the first mass at least at one target location. Particularly in this example, a position of the mass may be determined by the proximity sensors 130. Timestamps may be generated and stored each time, the mass is registered by the proximity sensors. From these timestamps, the period of oscillation may be determined and/or a speed of the mass during the oscillation may be determined. These can be used to derive the eigenfrequency of the wind turbine.

In examples, determining the frequency of the oscillation mode of the wind turbine may be carried out during idling of the wind turbine or during operation of the wind turbine.

In some examples, the method may further comprise determining a motion of a second mass of a second tuned mass damper in the wind turbine, and deriving the frequency of the oscillation mode of the wind turbine at least partially based on the determined motion of the second mass.

In some examples, the first mass and the second mass may be configured to move in substantially perpendicular directions.

Figure 4:
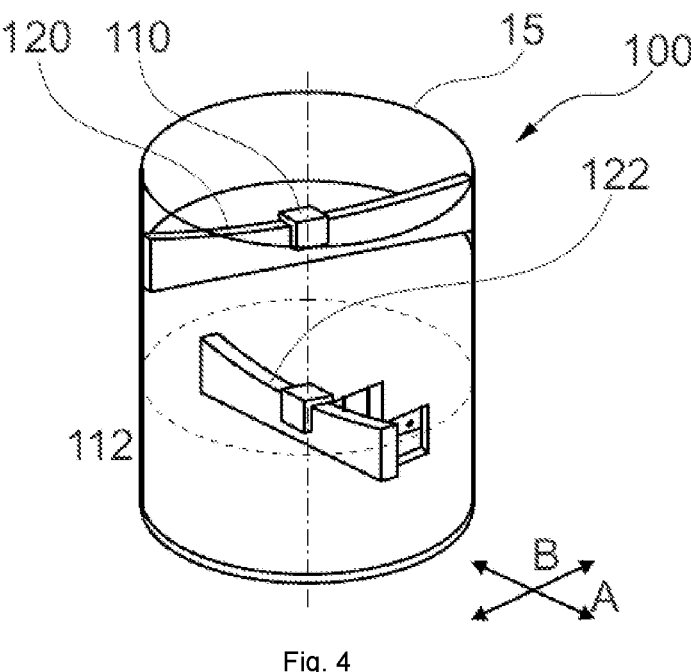
FIG. 4 schematically illustrates a portion of a wind turbine tower according to a further example comprising two tuned mass dampers.

In the example in FIG. 4, the first and second tuned mass dampers 100 comprise a first and a second mass 110, 112, each movably connected to a first and a second stationary structure 120, 122 respectively. The first mass 110 is configured to move in a main direction A and the second mass 112 is configured to move in a main direction B, which is substantially perpendicular to A.

FIG. 4 illustrates schematically an interior of a wind turbine tower. In other examples, the tuned mass damper(s) may be arranged in a nacelle of the wind turbine.

In a further aspect, a wind turbine comprising a tuned mass damper as previously disclosed is provided. The wind turbine may be an onshore wind turbine or an offshore wind turbine. Offshore wind turbines as disclosed may therefore be configured to estimate a frequency of an oscillation mode of the wind turbine to, e.g. estimate the state of the foundations. For example, an offshore wind turbine with a tuned mass damper as disclosed, may repeat the estimation of the frequency of the first oscillation mode (or other modes) to identify changes in the dynamic response of the system. This may, in turn, provide evidence of a modification of the wind turbine-soil coupling due to for example soil deterioration. Other reasons why the dynamic response of the system may change over time are structure deterioration or algae and barnacles' growth among others. Thus, a wind turbine comprising a tuned mass damper as disclosed may facilitate the identification of structural anomalies during operation of the wind turbine, this being more notorious in offshore wind turbines where direct inspection is tedious and complex. Further, repeating the estimation process over time also allows defining time-dependent operational exclusion zones, i.e. based on the evolution of the oscillation modes. This will be discussed in more detail in regard to method 700.

In some examples, the wind turbine may be an offshore wind turbine comprising a fixed foundation. The fixed foundation be a monopile foundation, a tripod foundation, a jacket foundation, a suctions bucket foundation or a gravity foundation among others.

In other examples, the offshore wind turbine may be a floating wind turbine, and the estimation of the frequency of the mode of oscillation may include the dynamic response of the floating structure.

Figure 5:
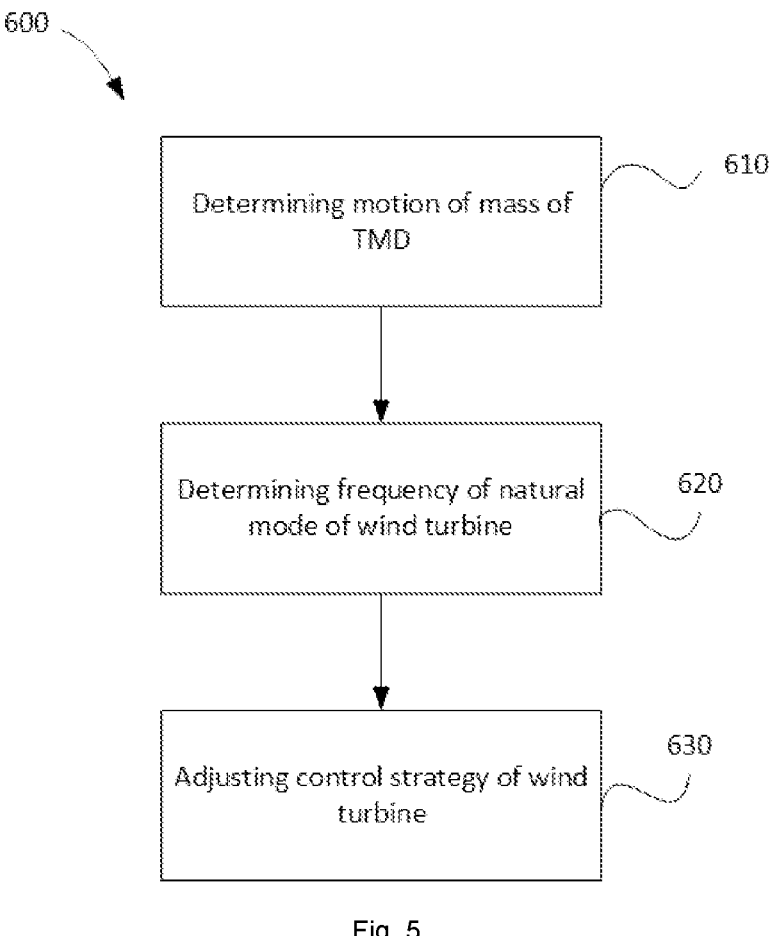
FIG. 5 shows a flowchart of an example of a method for estimating a frequency of an oscillation mode of a wind turbine according to an example of the present disclosure.

In another aspect of the disclosure, a method 600 is disclosed. Method 600 is suitable for estimating a frequency of an oscillation mode of a wind turbine. An example of a method 600 is schematically illustrated in FIG. 5.

The method 600 comprises, at block 610, determining motion of a mass of a first tuned mass damper. The method further comprises, at block 620, determining the frequency of the oscillation mode of the wind turbine 10 at least partially based on a motion of a first mass of a tuned mass damper.

Thus, the method 600 does not require the use of complex measurements, high computational requirements or human intervention to carry out the frequency estimation. This results in a suitable method to be performed during wind turbine idling or wind turbine operation in an autonomous manner.

Further, in examples, the first mass 110 in method 600 is configured to move in two directions. For example, the first mass 100 may be configured to describe a substantially pendular motion in a vertical plane. In other examples, the first mass 110 may be configured to move in three directions, e.g. a suspended mass.

In some examples, estimating the frequency of the oscillation mode is at least partially based on the motion of the first mass 110 and a motion of a second mass 112. Further, in some cases, the first and second mass 110, 112 may be configured to move in substantially perpendicular directions. For example, a first direction A may be a fore-aft direction and a second direction B may be a side-to-side direction of the wind turbine.

In some examples, block 610 of method 600 may be carried out during wind turbine idling or during wind turbine operation. This provides an accurate estimate of the frequency of oscillation modes without interrupting power production. In fact, method 600 may be repeated during wind turbine operation to monitor how the frequency of the oscillation modes evolves over time.

In examples, block 610 of method 600 may include monitoring the position of at least the first mass 110 with respect to the wind turbine 10 as a function of time. This may be done, e.g. by detecting the first mass at least at one target location. The time interval from a first crossing to a second crossing may be employed to estimate the frequency of oscillation of the wind turbine 10. In some cases, the first mass 110 may be detected by proximity sensors 130. Any of the sensors 130 previously disclosed in relation to the tuned mass damper 100 could be employed for this purpose.

In some examples, the method 600 may further comprise, at block 630, adjusting a control strategy of the wind turbine. Adjusting the control strategy of the wind turbine may include changing a pitch control strategy to avoid resonance in the wind turbine. Collective or individual pitch control may be used to reduce oscillations, and particularly resonance in a wind turbine. If an oscillation frequency of the wind turbine changes, the pitch control may also be changed accordingly, i.e. the pitch control aimed at reducing oscillations may be activated under different conditions (different rotor speeds, or wind speed, etc.).

In other examples, adjusting the control strategy may comprise changing rotational speed exclusion ranges and avoiding such rotational speed exclusion ranges as explained hereinafter.

Figure 6:
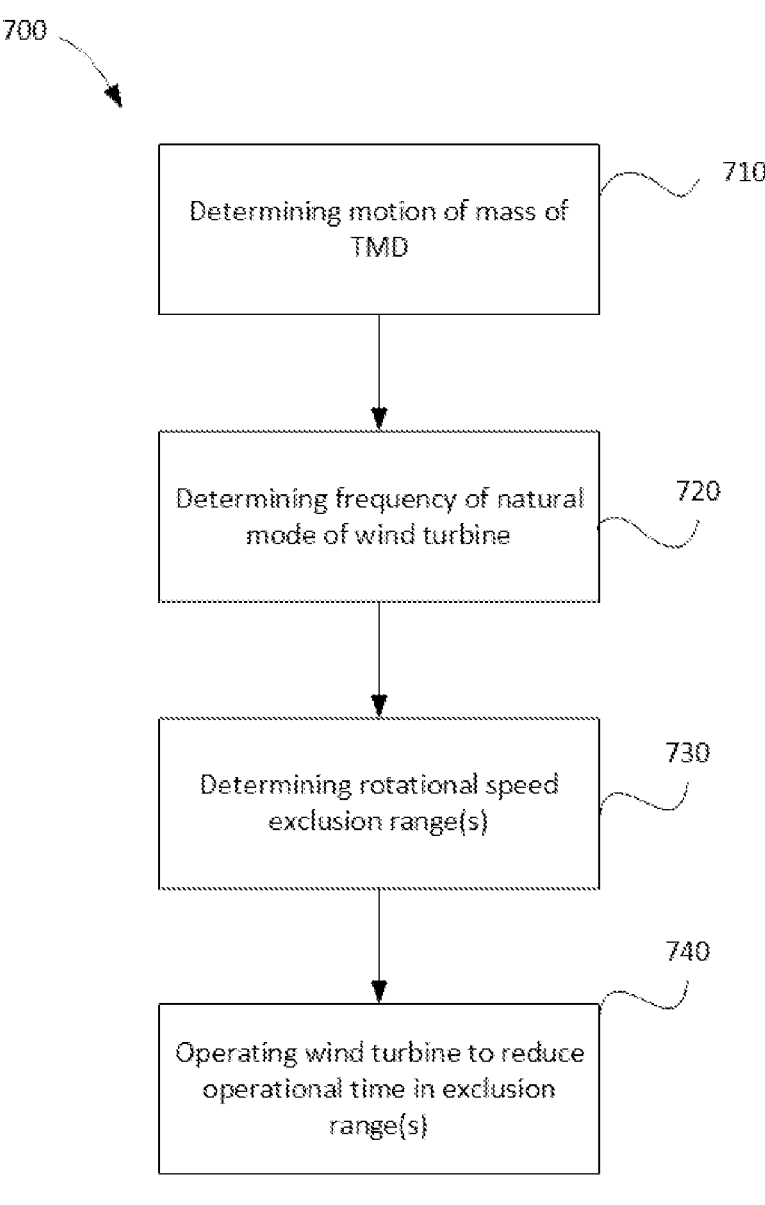
FIG. 6 shows a flowchart of an example of a method for operating a wind turbine according to the present disclosure.

In another aspect, a method 700 for operating a wind turbine is provided. A flow diagram schematically illustrating method 700 is shown in FIG. 6. Method 700 comprises at block 710 determining a motion of a mass of a tuned mass damper, and at block 720, determining a frequency of an oscillation mode (in particular a natural mode) of the wind turbine at least partially based on the motion of the first mass. The method may further comprise, at block 730, determining an exclusion range of rotational speeds of a rotor of the wind turbine to be avoided based on the derived frequency of the oscillation mode. Further, at block 740, the method 700 comprises operating the wind turbine so that the operational time of the wind turbine in an exclusion range of rotational speeds is reduced or avoided.

Further, this method 700 may be repeated during wind turbine idling or wind turbine operation to monitor the evolution of the frequency estimated. Thus a new frequency of the oscillation mode may be determined based on motion of the first mass after a certain period of operation. The method may then further comprise adjusting the exclusion range based on the new frequency.

Thus, exclusion zones may be determined for individual wind turbines. And these exclusion zones may be reliably determined and may be relatively narrow such that operation of the wind turbine can avoid the exclusion zone but annual energy production is not unduly affected.

In examples, operating 702 the wind turbine 10 may comprise ramping up or down the wind turbine rotational speed across the wind turbine rotational speed exclusion zone. This reduces the risk of structural resonance and mitigates the risks of the high loads associated with operation at such rotational speeds. In further examples, operating the wind turbine avoiding the exclusion ranges may comprise avoiding the exclusion ranges in case of a setpoint reduction.

In some examples, the method 700 may further comprise storing historical data relative to the estimated frequency of the oscillation mode. Further, method 700 may comprise estimating a remaining life expectancy of the wind turbine 10 at least partially based on the stored data. The stored data may comprise any data used or that could be used to estimate the frequency of an oscillation mode of a wind turbine. For example, the stored data may comprise a historical data of the motion of the first mass with respect to the wind turbine.

In addition, other variables such as wind speed, wind turbulence, sea conditions or others may be also stored.

In some examples, the tuned mass damper(s) in a wind turbine may be adjusted if a shift in eigenfrequency is detected. An objective of a tunes mass damper is indeed to limit and dampen the oscillations of the wind turbine. Adjusting the tuned mass damper may comprise changing a mass of the tuned mass damper and/or changing a damping coefficient or e.g. flexibility of the connection of the mass to the wind turbine. If active or semi-active TMD's are employed, adjustment of the TMD may be done remotely.

It is noted that all features of the tuned mass damper 100 can be included in methods 600, 700 suitable for estimating a frequency of an oscillation mode of a wind turbine and for operating a wind turbine respectively, and vice versa.

The method for determining a frequency of an oscillation mode of a wind turbine may comprising determining structural damage in a wind turbine if a significant shift of the eigenfrequency has occurred.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for determining an updated frequency of an oscillation mode of a wind turbine, the method comprising:

during a power-production or idling mode of the wind turbine, determining a frequency of oscillation motion of a first mass of a first tuned mass damper in the wind turbine;

deriving the updated frequency of the oscillation mode of the wind turbine in the power-production or idling mode at least partially based on changes to the frequency of oscillation motion of the first mass; and in a control system of the wind turbine, incorporating the updated frequency of the oscillation mode of the wind turbine into one or more control strategies so that the one or more control strategies are adjusted based on the updated frequency of the oscillation mode of the wind turbine.

2. The method of claim 1, wherein the oscillation mode of the wind turbine is a first normal mode.

3. The method of claim 1, further comprising determining a frequency of oscillation motion of a second mass of a second tuned mass damper in the wind turbine, and deriving the frequency of the oscillation mode of the wind turbine also based at least partially based on the frequency of oscillation motion of the second mass.

4. The method of claim 3, wherein the first mass and the second mass are configured to move in substantially perpendicular directions relative to each other.

5. The method of claim 1, wherein determining the frequency of oscillation motion of the first mass of the first tuned mass damper comprises deriving a speed of motion of the first mass by monitoring a position of the first mass with respect to the wind turbine as a function of time.

6. The method of claim 5, wherein monitoring the position of the first mass comprises detecting the first mass at a target location.

7. The method of claim 1, wherein adjusting the control strategy comprises changing a pitch control strategy to avoid resonance in the wind turbine.

8. A method for operating a wind turbine, the method comprising;

determining an updated frequency of an oscillation mode of the wind turbine during a power-production or idling mode of the wind turbine by:

determining a frequency of oscillation motion of a first mass of a first tuned mass damper in the wind turbine; and deriving the updated frequency of the oscillation mode of the wind turbine in the power-production or idling mode at least partially based on the frequency of oscillation motion of the first mass;

the method further comprising:

changing an exclusion range of rotational speeds of a rotor of the wind turbine so as to be based on the updated frequency of the oscillation mode; and operating the wind turbine so that an operational time of the wind turbine in the exclusion range is reduced or avoided due to changing the exclusion range to be based on the updated frequency of the oscillation mode.

9. The method of claim 8, further comprising determining a new frequency of the oscillation mode based on the frequency of oscillation motion of the first mass after a period of operation of the wind turbine and adjusting the exclusion range based on the new frequency.

10. The method of claim 9, further comprising adjusting the first tuned mass damper based on the new frequency.

11. The method of claim 9, further comprising storing historical data relative to the frequency of the oscillation mode; and estimating a remaining life expectancy of the wind turbine at least partially based on the stored historical data.

12. A wind turbine, comprising:

a tuned mass damper having a first mass;

a control system in communication with the tuned mass damper, the control system configured to carry out the method according to claim 1.

*    *    *    *    *